(No Model.)
G. B. ADAMS.
RUBBER TIP ATTACHMENT FOR PENCILS OR OTHER ARTICLES.
No. 368,440. Patented Aug. 16, 1887.
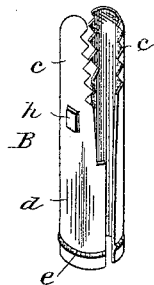
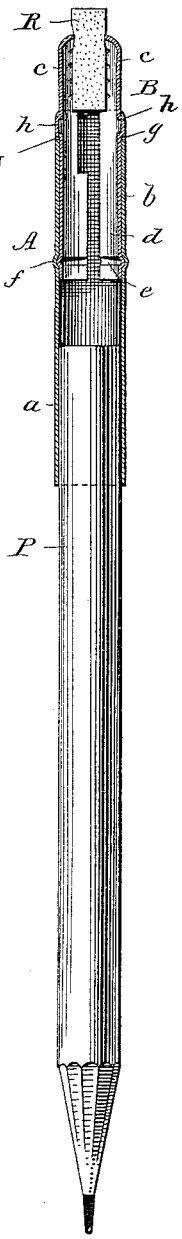
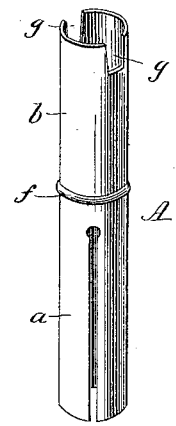
Witnesses:
Marvin A. Custis.
H. F. Riley.
Inventor:
George B. Adams
by Marcellus Bailey
his attorney

UNITED STATES PATENT OFFICE.

GEORGE B. ADAMS, OF NEWARK, NEW JERSEY, ASSIGNOR TO THE EAGLE PENCIL COMPANY, OF NEW YORK, N. Y.

RUBBER-TIP ATTACHMENT FOR PENCILS OR OTHER ARTICLES.

SPECIFICATION forming part of Letters Patent No. 368,440, dated August 16, 1887.

Application filed June 28, 1887. Serial No. 242,737. (No model.)

*To all whom it may concern:*

Be it known that I, GEORGE B. ADAMS, of Newark, Essex county, New Jersey, have invented a certain new and useful Improvement in Rubber-Tip Attachments for Pencils and other Articles, of which the following is a specification.

This invention is directed to means for conveniently and readily tightening or relaxing the grip or bite of the grasping-jaws of a rubber-tip attachment upon the block of rubber or other erasive material placed between them. To this end the jaws are combined with an encircling clamping-sleeve in such manner that the two parts may rotate the one with relation to the other; and the meeting surfaces of said jaws and sleeve are formed the one with swells or protuberances and the other with corresponding openings or recesses, whereby the jaws are caused to relax or tighten their hold upon the rubber according as the said swells or protuberances are brought into or out of register with said openings or recesses.

In the accompanying drawings, Figure 1 is a perspective view of the jaw portion of the attachment. Fig. 2 is a like view of the sleeve portion of the attachment. Fig. 3 is a longitudinal central section of the complete device fitted to the end of a pencil.

A is the sleeve portion, formed, like a tube of a pencil-point protector, with a split portion, $a$, to receive either end of the pencil P, and an unsplit portion, $b$, to receive the tubular shank of the jaw portion. The jaw portion B has two jaws proper, $c$, on the prolongation of a tubular split shank, $d$, provided with an annular external rib, $e$, which, when the part B is inserted in place in the part A, snaps into a corresponding annular recess, $f$, in the latter, as seen in Fig. 3, thus assuring the parts from independent longitudinal movement without interfering with the free rotation of the one with respect to the other.

In the upper end of the sleeve are cut two diametrical notches or openings, $g$, and upon the jaws at corresponding points are swells or protuberances $h$, one for each jaw. When the parts are fitted together, as seen in Fig. 3, these swells can be brought into or out of register with the openings $g$ by turning the jaw portion B in the sleeve. In Fig. 3 the swells are shown as registering with and entering the openings $g$. In this position the jaws relax somewhat their hold on the rubber R. By turning, however, the jaws in the sleeve, so as to bring the swells $h$ under the uncut or unrecessed portion of the sleeve, the jaws thereby will be pressed nearer to one another, and consequently will be caused to tighten their grip on the rubber.

It is manifest to the skilled mechanic that the details of this contrivance can be varied in a number of respects without departure from the principle of the invention. A cam-like formation upon the meeting surfaces of the sleeve and the jaws would accomplish the same result, and the swells or protuberances, as well as the openings or recesses, can be made of various shapes. The projections or swells also may be on the sleeve and the corresponding recesses or openings in the jaws, what is essential being that the clamping and releasing action be effected by the rotary movement of the jaws with respect to the device by which they are encircled. That device in the present instance is a sleeve which is formed in one with a socket to receive the pencil; but manifestly the attachment of the contrivance to the pencil can be effected in other ways.

What is claimed herein as novel is as follows:

1. In a rubber-tip attachment for pencils and the like, the combination of rubber grasping-jaws with an encircling sleeve, the two being rotatable with relation to each other, and being provided the one with swells or protuberances and the other with openings or recesses, which may be brought into or out of register with said swells by rotating the one part in or upon the other, substantially as and for the purposes hereinbefore set forth.

2. The jaw portion B, provided with the swells $h$ and annular rib $e$, in combination with the sleeve portion A, having openings or recesses $g$ and annular recess $f$, as and for the purposes hereinbefore set forth.

In testimony whereof I have hereunto set my hand this 14th day of June, A. D. 1887.

GEORGE B. ADAMS.

Witnesses:
C. S. BRAISTED,
LEOPOLD AUSBACHER.